Geo. W. FITTS.
Rubber Block Traction Wheel.
No. 117760. Patented Aug 8 1871.
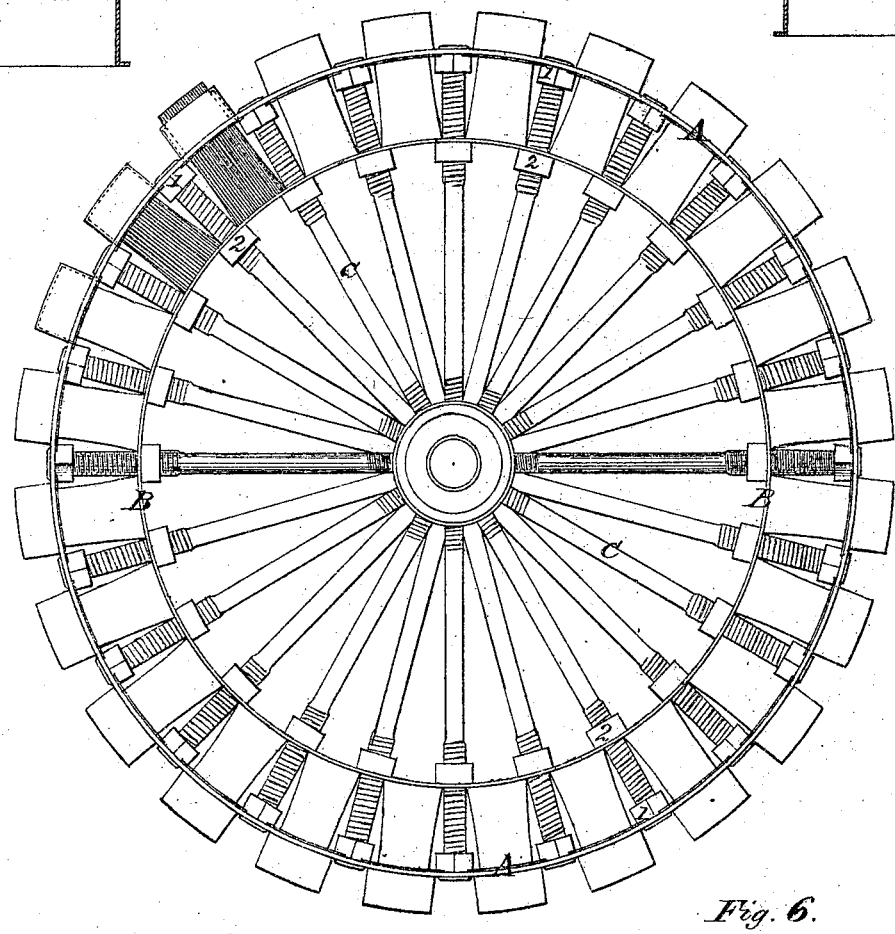
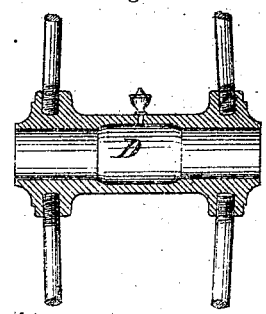
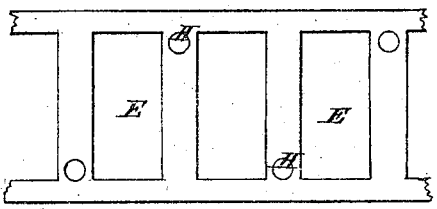
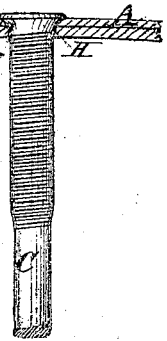
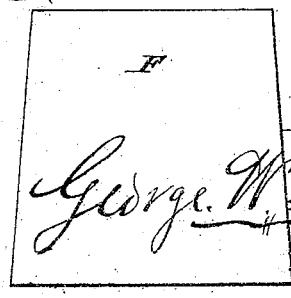
Witnesses:
Inventor:
George W. Fitts 117,760

UNITED STATES PATENT OFFICE.

GEORGE W. FITTS, OF OBERLIN, OHIO.

IMPROVEMENT IN RUBBER-BLOCK TIRES FOR TRACTION-WHEELS.

Specification forming part of Letters Patent No. 117,760, dated August 8, 1871.

*To all whom it may concern:*

Be it known that I, GEORGE W. FITTS, of the village of Oberlin, county of Lorain and State of Ohio, have invented certain Improvements in a Wheel for Road-Steamers and other vehicles, of which the following is a specification:

My invention consists in a wheel with two broad rims, one smaller and resting below or within the other, the spokes of which are so arranged as to give tension to these rims. Through and at right angles with the edges of the outer rim are formed slots or pockets, which pass through to the surface of the inner rim. Into these pockets are inserted separate blocks of rubber, whose bases rest upon the surface of the inner rim and whose outer ends project slightly beyond the surface of the outer rim, the outer ends of these rubber blocks being covered with a metal cap, which fits the blocks and the pockets into which they are inserted and work. These caps have a flange around their lower ends, which strike against the under surface of the outer rim, thus keeping the caps and blocks in their place within the pockets. The object of this wheel, when thus formed, is to give great strength, traction, and elasticity.

Figure 1 is a side view of a wheel embodying my invention. Fig. 2 represents the slots or pockets in the surface of the outer rim of the same. Fig. 3 is a view of the rubber block. Fig. 4 represents the metal cap. Fig. 5 shows the conical-shaped end of the spoke and socket in which it rests.

A is the outer rim of the wheel; it is made of a broad band of iron. The edges of this rim are perforated at suitable distances apart with sockets H, Fig. 5, for the reception of the outer end of the spokes, which are formed to fit and rest in these sockets. Through this rim are cut or formed slots or pockets, Fig 2. These slots extend across the rim, leaving a narrow margin or space between and around the same. B is the small or inner rim. This rim is perforated near the edges for the reception of the spokes, which pass through this rim and hold it in its place. (See B, Fig. 1.) C are the spokes. These spokes are formed (Fig. 5) largest at the outer end to a point below the inner rim, and are conical-shaped at the extreme outer ends, which are fitted to the socket H in the rim A. Both ends are threaded, the lower one to screw into the hub of the wheel, and the upper one for the reception of two nuts, Figs. 1 and 2. These nuts are placed, first, the upper one directly under the outer rim, and, when turned up, forces the rim out, bringing the head of the spoke close down into the socket H, thus giving tension to the whole wheel. The other of the two nuts, 2, (Fig. 1,) is placed on the under side of the inner rim, and forces it in or out, as may be necessary, at the same time holding it in its place upon the spokes. D is the hub of the wheel. This hub (Fig. 6, D) has two rims or projections, which receive the spokes from each edge of the outer rims A and B. These projections are of greater diameter than the body of the hubs, and receive the spokes a little wider apart than at the point, where they pass through the outer rims. Thus they stand bracing from the hub to these rims. E are the slots or pockets (Fig. 2) for the reception of the rubber blocks and metal caps. These pockets may be formed by cutting through the outer rim, as described above, and attaching lips or projections around the surface and near each edge of the inner rim, (Fig. 1, B,) which hold the base of the rubber block in its place, the outer end with its cap passing through the slot in the outer rim A, which holds it in its place, permitting it to work up and down as the pressure may be applied to its surface. F is the rubber block, (Fig. 3.) These blocks are oblong in shape, and a little larger at the base than at the top. They are inserted into the pocket the widest part running across the surface or at right angles with the edges of the rim. The base of the block is calculated to be of sufficient size, when all are inserted, to just cover the surface around the inner rim, and are to be of sufficient length to extend from this rim through the outer one a sufficient distance to give elasticity as the pressure or weight is applied to their surface. G is the metal cap. These caps may be formed of any kind of hard metal, and are made to fit and inclose the outer end of the rubber block. They should be made of sufficient length to extend from the surface of these blocks through the slot in the outer rim to the under surface of this rim. Around the outer surface of the lower end of this cap is formed a flange (Fig. 4, G) or projection. The cap is inserted through the slot in the outer rim from the lower side, and the blocks are inserted into the cap in the same way, their bases resting upon the inner rim. When thus in place the elasticity of the block forces the cap through the slot and the flange up against the under side of the rim, thus keeping the block and cap in their places, and also permitting them to work back and forth as the pressure may be applied to them. For greater traction the face of the cap may be left open, excepting a narrow shoulder, permitting the block to protrude slightly beyond the face of the cap.

I claim—

1. The combination of the spokes C with the rims A B, nuts 1 2, and hub D, all arranged and acting as and for the purpose set forth and described.

2. The outer rim of a wheel perforated with slots or pockets for the reception of rubber blocks and metal caps, as and for the purpose described.

3. Separate blocks of rubber inserted into slots or pockets in the rim of a wheel, as and for the purpose described.

4. The metal cap for covering separate blocks of rubber inserted into the rim of a wheel, as and for the purpose described and set forth.

GEORGE W. FITTS.

Witnesses:
ANNA S. FITTS,
B. W. LOCKE.